United States Patent [19]

Naton

[11] Patent Number: 5,384,345
[45] Date of Patent: Jan. 24, 1995

[54] COMPOSITIONS CONTAINING HOLLOW MICROSPHERES
[75] Inventor: Paul E. Naton, North Ridgeville, Ohio
[73] Assignee: Oatey Company, Cleveland, Ohio
[21] Appl. No.: 94,500
[22] Filed: Jul. 20, 1993

Related U.S. Application Data

[63] Continuation-in-part of Ser. No. 851,852, Mar. 16, 1992, abandoned, which is a continuation-in-part of Ser. No. 809,421, Dec. 17, 1991, abandoned.
[51] Int. Cl.$^6$ ............................................. C08K 7/28
[52] U.S. Cl. .................... 523/218; 156/307.5; 156/308.2; 156/309.6; 523/219; 524/113; 524/360; 524/361; 524/365; 524/493; 524/494
[58] Field of Search ............... 523/218, 219; 524/113, 524/360, 361, 365, 493, 494; 156/307.5, 308.2, 309.6, 310, 306.6, 294, 295, 293

[56] References Cited

U.S. PATENT DOCUMENTS

| | | | |
|---|---|---|---|
| 3,230,184 | 1/1966 | Alford | 260/2.5 |
| 3,314,838 | 4/1967 | Erwin | 428/406 |
| 3,365,315 | 1/1968 | Beck et al. | 106/40 |
| 3,765,983 | 10/1973 | Putzier | 156/293 |
| 3,770,547 | 11/1974 | Kelsey | 156/314 |
| 3,846,511 | 11/1974 | Hill et al. | 260/880 R |
| 3,873,475 | 3/1975 | Pechacek et al. | 260/2.5 B |
| 3,917,554 | 11/1975 | Inoue et al. | 524/365 |
| 4,053,448 | 10/1977 | Halle | 260/40 R |
| 4,089,726 | 5/1978 | Ishii et al. | 156/308.2 |
| 4,098,719 | 7/1978 | Huchsheck | 252/364 |
| 4,223,067 | 9/1980 | Levens | 428/313.9 |
| 4,374,874 | 2/1983 | Blistein et al. | 523/219 |
| 4,403,048 | 9/1983 | Blitstein et al. | 523/219 |
| 4,412,012 | 10/1983 | Bonley et al. | 523/218 |
| 4,492,732 | 1/1985 | Murphy et al. | 523/219 |
| 4,522,958 | 6/1985 | Das et al. | 523/216 |
| 4,526,910 | 7/1985 | Das et al. | 523/443 |
| 4,634,724 | 1/1987 | Harvey et al. | 428/313.9 |
| 4,672,084 | 6/1987 | Dierdorf et al. | 524/113 |
| 4,687,798 | 8/1987 | King | 524/100 |
| 4,692,480 | 9/1987 | Takahishi et al. | 523/218 |
| 4,735,837 | 4/1988 | Yanaka et al. | 428/406 |
| 4,788,002 | 11/1988 | King | 252/364 |
| 4,980,383 | 12/1990 | Shimazu et al. | 521/91 |
| 5,028,456 | 7/1991 | Naton | 427/142 |
| 5,064,868 | 11/1991 | Simpson et al. | 521/54 |
| 5,252,632 | 10/1993 | Savin | 523/219 |
| 5,252,634 | 10/1993 | Patel et al. | 523/218 |

FOREIGN PATENT DOCUMENTS

| | | |
|---|---|---|
| 0271296 | 6/1988 | European Pat. Off. . |
| 0441159 | 8/1991 | European Pat. Off. . |

OTHER PUBLICATIONS

European Search Report–92121451.6 (EP 92121451).
Derwent–89-361991, cited in European Search Report of EP–92121451.6.
Naton, "Understanding Solvent Welding", The North Dakota Mechanical Contractor, First Quarter, 1991, pp. 23–24.
"Scotchlite Glass Bubbles, Engineered Fillers for Industry", 3M Co..
"Scotchlite Glass Bubbles, General Purpose", Series 3M Co.
"Adhesive Technology", Arthur H. Landrock, pp. 225–236, Noyes Publications, Park Ridge, N.J. (1985).
ASTM D2235-88.
ASTM D2369-87.
ASTM D2564-88.
ASTM D2855-83.
ASTM F493-88.

*Primary Examiner*—Veronica P. Hoke
*Attorney, Agent, or Firm*—Renner, Otto, Boisselle & Sklar

[57] ABSTRACT

A composition is described with comprises a mixture of
(A) from about 5% to about 60% by weight of at least one water-insoluble polymer;
(B) from about 1% to about 30% by weight of inorganic or synthetic resinous hollow microspheres; and
(C) from about 20% to about 85% of at least one volatile organic liquid which is a solvent for the polymer of (A).

The compositions also may contain (D) at least one solid particulate inorganic filler. Adhesive compositions such as solvent cements prepared in accordance with the present invention are characterized as low VOC compositions wherein the VOC is, for example, less than 500 or even less than 400 grams per liter.

31 Claims, No Drawings

COMPOSITIONS CONTAINING HOLLOW MICROSPHERES

CROSS-REFERENCE TO RELATED APPLICATIONS

This application is a continuation-in-part of copending application Ser. No. 07/851,852, filed Mar. 16, 1992, now abandoned which is a continuation-in-part of application Ser. No. 07/809,421, filed Dec. 17, 1991, now abandoned. The disclosures of these prior applications are hereby incorporated by reference in this application in their entirety.

TECHNICAL FIELD

This invention relates to compositions which comprise water-insoluble polymers and hollow microspheres. This invention also relates to adhesive and sealant compositions, and in particular, to adhesive compositions useful for forming a bond or weld between two polymeric surfaces. More particularly, the invention relates to such compositions which are characterized as low VOC solvent cements useful for bonding or welding polymeric surfaces.

BACKGROUND OF THE INVENTION

Adhesives, often referred to as cements, glues or pastes are defined generally as substances capable of holding materials together by surface attachment. Adhesives may attach to surfaces and develop the internal or cohesive strength necessary to hold the materials together while cooling from liquid to solid state, while loosing solvent, or during a chemical reaction. Many of the substances designated as adhesives may also be designated as caulking, potting, sealing, casting or encapsulating compounds when employed in a thick mass. In a more restrictive sense, to be termed an adhesive, a substance should be a liquid or a tacky semi-solid, at least for a short period of time to contact and wet a surface, and be used in a relatively thin layer to form a useful joint capable of transmitting stresses from one substrate to another. Thus, the term "adhesives", as used in this specification and in the claims includes cements, glues and pastes.

Solvent cementing is a process in which thermoplastics, usually amorphous, are softened by the application of a suitable solvent or mixture of solvents, and then pressed together to effect a bond. The resin itself, after evaporation of the solvent, acts as the adhesive. Many thermoplastic substrates are easier to join effectively by solvent cements than by conventional adhesive bonding. Generally, a small amount of the resin to be cemented is dissolved in a solvent to form the cement. The inclusion of the resin aids in gap filling, accelerates setting, and reduces shrinkage and internal stresses.

Solvent cements also have been utilized to bond different plastic materials to each other, but in such instances, the solvent must be a solvent for both plastics. Usually in such instances, a mixture of solvents is used. The solvent softens (dissolves) the surface of the resin to be bonded, and the surface becomes tacky. At this point, the surfaces are brought into contact with each other, often under pressure, and dried.

For the past twenty-five years, solvent cements have been used for joining ABS (acrylonitrile-butadiene-styrene resin), PVC (polyvinylchloride), and CPVC (chlorinated polyvinylchloride) plastic pipe and fittings. The amount of such plastic pipe used for conveying a variety of liquids is enormous. The major uses are drain, waste, vent, sewer and potable water. Plastic pipe has continued to displace the more traditional materials used for the same purpose such as copper, steel, galvanized metal, cast iron, lead and concrete asbestos pipe. Plastic pipe currently is the material of choice in the home, municipal, and manufacturing industries.

Currently available solvent cements generally have a volatile organic chemicals (VOC, calculated in accordance with ASTM D-2369) of from about 600 to about 750 gms/liter. As a result of this awareness, regulations are being enacted into law by Congress and in the various states for controlling and setting limits for the VOC of paints, coatings and other materials such as solvent cements.

Plastic pipe products including solvent cements, cleaners and primers have now come under newly proposed state regulations. In California, for example, where the first air pollution control regulations were implemented, the California Environmental Quality Act (CEQA) along with the South Coast Air Quality Management District (SCAQMD) and the Bay Area Quality Management District (BAAQMD) have stated that the VOC content of solvent cements must be dramatically reduced by Jan. 1, 1994. Thus, solvent cements as currently formulated for joining plastic pipe cannot be used after Jan. 1, 1993, and unless new solvent cements can be developed which meet the new standards, the use of plastic pipe will become obsolete.

Historically, ASTM specifications were developed and adopted by pipe manufacturers in the early 1970's. Joining materials such as solvent cements were also included, and ASTM specifications were written specifically for these materials. National code organizations such as United Plumbing Code (UPC) and the International Association of Plumbing and Mechanical Officials (IAPMO) adapted ASTM standards which were further adapted and included into state and local plumbing codes for the home, building and construction industries.

In the mid 1970's a third party certification organization, the National Sanitation Foundation International (NSF) became the recognized authority for testing, certifying and listing those manufacturers who voluntarily submit their products to NSF. ASTM tests that apply to plastic pipe products are performed by NSF. The listing book published by the NSF entitles plastic pipe product manufacturers to use the NSF logo or seal on their products. Many local, state and other code bodies have written into their plumbing ordinances that plastic pipe products must bear the NSF seal.

The current ASTM standard which relates to ABS solvent cements is ASTM D-2235 which specifies that the ABS solvent cements will contain a minimum of 15% by weight of ABS resin and the remainder is methyl ethyl ketone (MEK) solvent. To have a useful product, the ABS cement typically utilizes 30% to 35% resin and the remainder is MEK. The purpose of using higher than minimum resin is to produce a product that has a suitable viscosity for application to pipes and fittings. Viscosity is measured in centipoise, and a typical ABS cement will have a viscosity of 1000 to 3000 centipoise.

The ASTM standard for PVC solvent cements is ASTM D-2564. According to this standard, such solvent cements contain a minimum of 10% PVC resin, inert fillers, and the remainder is one or more solvents from the group of tetrahydrofuran (THF), cyclohexanone (CYH), MEK, and acetone.

ASTM F-493 sets forth the requirements for CPVC solvent cements as containing a minimum of 10% CPVC resin, inert fillers, and the remainder is one or more solvents including THF, CYH, MEK and/or acetone.

All three classes of solvent cement have a high solvent to solids content which is believed to be necessary for a solvent cement to perform satisfactorily. The high solvent content allows for penetration and softening of the pipe outer surface and the surface of the inside of the coupling. Prior to application of the cement, cleaners and/or primers are recommended per ASTM D-2855. Most codes, require the use of a cleaner or primer. Rapid evaporation of the solvents is necessary to insure handling strength of freshly solvent cemented pipe and also insuring the final cure. Cure is defined as the stage where most of the solvents applied have evaporated leaving the solvent welded joints fused together so that pressure can be successfully applied.

The need for safer and lower VOC solvent cements which are easier to apply, cost effective, and which cure within a reasonable period of time without the use of heat, pressure, UV light or extraordinary mechanical devices is paramount. The bonding or adhesive properties of the solvent cements must be satisfactory for the intended use whether non-pressure drain, waste or vent (DWV) or pressure systems used in potable water applications.

U.S. Pat. No. 4,687,798 describes and claims a solvent cement for joining polymers comprising from about 10% to 15% of a water-insoluble polymer such as PVC or ABS, and a solvent comprised of ethyl acetate and N-methyl-2-pyrrolidone. U.S. Pat. No. 4,788,002 claims a similar solvent cement which consists of a solution of a solvent of ethyl acetate and N-methyl-2-pyrrolidone wherein the ethyl acetate ranges from about 3% to about 90% with the balance being N-methyl-2-pyrrolidone.

U.S. Pat. No. 4,098,719 describes polyvinyl chloride solvent weld primer compositions for use in the assembly of polyvinyl chloride pipe and fittings to themselves or to ABS pipe or fittings. The primer consists essentially of an organic solvent containing from about 0.5 to about 2.5 weight percent of an unplasticized polyvinyl chloride resin dissolved in the solvent which is a mixture of tetrahydrofuran and dimethylformamide in a weight ratio of from about 164:1 to 1:1.

Solvent cements are also described in U.S. Pat. No. 3,765,983 which are applied with specially-designed applicators. The solvent cements which are described comprise a solution of a PVC, ABS or CPVC in a suitable solvent such as tetrahydrofuran, cyclohexanone, dimethylformamide, or mixtures thereof. The resin in the cement is preferably the same as the resin of the pipe and fittings to be joined.

U.S. Pat. No. 3,770,547 relates to a method for adhesively bonding surfaces which includes the use of adhesives including solvent cements such as volatile solvent solutions of polyvinylchloride, ABS polymers, cellulose acetate, etc., in organic liquid vehicles such as ethanol, methanol, methyl ethyl ketone, acetone, tetrahydrofuran, etc.

U.S. Pat. Nos. 3,230,184; 3,873,475; and 4,053,448 relate to polyester resin compositions which contain hollow glass microspheres. The compositions described in the '475 patent are useful as lightweight patching, caulking or sealing compositions, and the '448 patent describes the compositions as being useful patching compositions for repairing imperfections in metal surfaces. The polyester resin molding compositions described in the '184 patent are reported to yield products of substantial strength and lighter weight. The compositions also contain a fibrous filler material in addition to the hollow spheres.

Inorganic filler materials which comprise a mixture of an inorganic powder and inorganic hollow microspheres are reported to be useful in a curable polyester composition in U.S. Pat. No. 5,028,456. The curable composition comprises, in addition to the inorganic filler, at least one unsaturated polyester resin, at least one hydrocarbon monomer copolymerizable with the polyester, and at least one aryl sulfonamide-aldehyde resin. The compositions are useful as plastic body fillers for repairing metal surfaces.

SUMMARY OF THE INVENTION

A composition is described with comprises a mixture of
- (A) from about 5% to about 60% by weight of at least one water-insoluble polymer;
- (B) from about 1% to about 30% by weight of inorganic or synthetic resinous hollow microspheres; and
- (C) from about 10% to about 85% of at least one volatile organic liquid which is a solvent for the polymer of (A).

The compositions also may contain (D) at least one solid particulate inorganic filler. Compositions such as solvent cements prepared in accordance with the present invention are characterized as low VOC compositions wherein the VOC is, for example, less than 500 or even less than 400 grams per liter.

DESCRIPTION OF THE PREFERRED EMBODIMENTS

In addition to the definitions contained in the Background, the following terms utilized in the present application and claims have the following meanings:

weld—to fuse or join two components together through the use of the adhesive compositions of the present invention;

solvent—a substance capable of dissolving another substance;

volatile solvent—a solvent which evaporates rapidly at room temperature or at a slightly elevated temperature;

solvent welding—a process that utilizes solvents to join two surfaces together;

solvent cement—an adhesive made by dissolving a plastic resin or compound in a suitable solvent or mixture of solvents. The solvent cement dissolves the surfaces of the pipe and fittings to form a bond between the mating surfaces provided the proper cement is used for the particular materials and proper techniques are followed (ASTM 2235);

adhesive (composition)—includes any liquid coating composition which is capable of forming a bond or a weld between two surfaces;

primer—conventionally employed liquid composition which prepares the surface to be bonded for satisfactory adhesive bonding or welding;

cured—when most of the solvent applied has evaporated leaving a thermoplastic solvent welded joint fused together so that pressure can be successfully applied;

DWV—drain, waste, vent applications.

The compositions of the present invention comprise a mixture of
- (A) from about 5% to about 60% by weight of at least one water-insoluble polymer;
- (B) from about 1% to about 30% by weight of inorganic or synthetic resinous hollow microspheres; and
- (C) from about 10% to about 85% by weight of at least one volatile organic liquid which is a solvent for the polymer of (A).

The compositions also may, and generally do contain
- (D) at least one solid particulate inorganic filler.

The compositions of the invention are useful in a variety of applications including use as adhesives, cements (including solvent cements) glues or pastes for holding together materials by surface attachment, and as sealants which are load-bearing elastic jointing and insulating materials.

(A) Water-Insoluble Polymer

The compositions of the present invention comprise at least one water-insoluble polymer, especially those polymers which are generally used in adhesive compositions such as epoxies, phenolics, phenol-aldehydes, urea-aldehydes, polyesters, polycarbonates, polyacrylates, polyacrylamides, polyamides, furans, polyvinyl acetates, PVCs, CPVCs, polyvinylidene fluoride (PVDF), ABS, styrene polymers, terpolymers of acrylonitrile, butadiene and α-methyl styrene, terpolymer of methyl or ethyl acrylate, butadiene and styrene, terpolymers of acrylic esters, styrene and acrylonitrile (ASA), polymers of styrene and maleic anhydride (SMA), styrene-acrylonitrile polymers (SAN), cellulose acetates, cellulose acetate butyrate, cellulose propionate, cellulose nitrate, polysulfones, polysulfides, polyphenylene oxides (PPO), polyetheramides, and various copolymers such as copolymers of PVC and vinyl acetate, etc. When the compositions are to be used as a solvent cement, the water-insoluble polymers which are soluble in a volatile solvent to provide an effective cement include PVC, CPVC, PVDF, ABS, polycarbonate, polystyrene, polyacrylates, cellulose acetate, polyacrylamide, polyamide, etc. Of these polymers, PVC, CPVC and ABS are of the most interest due to their widespread use. The polymer or polymer mixture dissolved in the solvent to form the cement of the invention may be freshly prepared polymer, and in some instances may be polymer regrind. Generally, the polymer or polymers in a cement are identical or at least chemically similar to the polymer surface(s) to be cemented.

The ABS polymer dissolved in the solvent to form the composition of the present invention generally will have a minimum butadiene content of 6%, a minimum acrylonitrile content of 15% and a minimum styrene or substituted styrene content of 15%. In one embodiment, useful ABS resins contain from about 25–45% acrylonitrile, 6–15% butadiene and 40–60% styrene or substituted styrene. Useful ABS polymers are available commercially from General Electric, for example. Blendex ADG-21 is an ABS resin from GE which is approved for use in NSF sanctioned pipe applications, and this resin comprises about 35.4% acrylonitrile, 7.46% butadiene and 56.9% styrene. Its density is 1.02 g/cc. Blendex 211 is another ABS resin froraGE which contains about 36.3% acrylonitrile, 9.50% butadiene, and 54.1% styrene. The bulk density of Blendex 211 is 1.03 g/cc.

In another embodiment, the water-insoluble resin is a vinyl chloride polymer or copolymers including, for example, polyvinyl chloride (PVC) and chlorinated polyvinyl chloride (CPVC). Vinyl chloride polymers and copolymers are well known in the art. Copolymers of vinyl chloride include, for example, copolymers of vinyl chloride with one or more copolymerizable monomers having at least one terminal $CH_2=C<$ group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, preferably up to 20% of the copolymerizable monomers. In one embodiment, the inherent viscosity of the PVC polymers and copolymers may range from about 0.30 to 1.5 and more often from about 0.30 to 0.95. PVC homopolymers and copolymers are available from a number of commercial sources. For example, a PVC homopolymer resin is available from Occidental Chemical Corporation under the designation OXY 190 and from B. F. Goodrich under the designation "Geon" such as Geon 110X334. Copolymers are available from Occidental Chemical Corporation under the designation OXY 1415 (16% bound vinyl acetate, inherent viscosity 0.37, and bulk density 0.66 g/cc) and OXY 1515 (13.8% bound vinyl acetate, inherent viscosity 0.47, and bulk density of 0.61).

The chlorinated polyvinyl chlorides (CPVC) useful in the compositions of this invention include chlorinated polyvinyl chloride homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57 to about 75% by weight of chlorine. CPVC is often the resin of choice where its high heat deflection resistance is desirable such as in hot water piping systems. CPVC resins useful as the water-insoluble resin in the composition of the invention are available commercially from, for example, B. F. Goodrich under the trade designation Geon 674X571.

The compositions of the present invention generally will contain at least 5% or 10% or 20% or 30% up to about 50% or 60% of the water-insoluble polymers. More often, the compositions will contain from about 20% to about 50% by weight of the water-insoluble polymer when the polymer is an ABS polymer. When the compositions contain PVC or CPVC, the amount of the polymer is from about 10% to about 40% by weight.

(B) Inorganic or Synthetic Resinous Hollow Microspheres

The inorganic or synthetic resinous hollow microspheres incorporated into the compositions of the present invention generally have a density of less than about 0.6 g/cc and a mean diameter of less than about 200 microns, more often less than about 150 microns. The compositions of the invention will contain at least 1% and more often at least 3% by weight of the hollow microspheres and may contain up to about 10% or 20% or even 30% by weight of the microspheres. The microspheres act as a filler and decrease the density of the adhesive composition.

The inorganic hollow microspheres used in the present invention preferably are glass microspheres or microbubbles such as those described in U.S. Pat. No. 3,365,315. The walls of these microspheres are made by expanding solid glass particles at temperatures above 1000° C. to form tiny hollow spheroids having an apparent density in the range of about 0.14 to about 0.38 g/cc, a wall thickness of about 0.5 to 2.0 microns, and an average particle size of about 60 microns. Other suitable glassy or inorganic microspheres of synthetic fused water-insoluble alkali metal silicate-based glass are described in U.S. Pat. No. 3,230,184, and microspheres made of sodium silicate which are useful in the present invention are described in U.S. Pat. No. 3,030,215. Microspheres prepared from heat expanded natural minerals such as perlite, volcanic ash, fly ash, vermiculite, etc., also may be used but are less preferred.

Hollow glass microspheres (referred to as glass bubbles) which are useful in the present invention are available commercially from The 3M Company under the trade designation Scotchlite ™ Glass Bubbles. The chemical properties of these glass bubbles are reported to resemble those of a soda-lime-borosilicate glass. Glass bubble designation C15/250 has a nominal average particle density (ASTM D-2840) of 0.15 g/cc, a range of 0.12 to 0.18 g/cc and a calculated bulk density of 0.07 to 0.12 g/cc. Bubble type E22/400 has a nominal average particle density of 0.22 g/cc and a range of 0.19 to 0.25 g/cc. The bulk density of the E22/400 is in the range of 0.09 to 0.17. Other glass bubbles available from 3M include K-2 glass bubbles, S60/10,000 having a nominal average particle density of 0.60, and B23/500 having a nominal average particle density of 0.23. Inorganic hollow microspheres also are available from other commercial sources such as the Philadelphia Quartz Co., Valley Forge, Pa. under the designation "Q-CEL" Inorganic microspheres; Pittsburgh Corning Corp., Pittsburgh, Pa.; Emerson & Cuming Inc., Canton, Mass.; etc.

Organic resinous microspheres may also be utilized in the compositions of the present invention provided they are relatively inert and not soluble in the solvent (C). Thermoset resins generally have such properties. Examples include microspheres of epoxy resins; urea-formaldehyde having diameters ranging from 2–60 microns and a density of about 0.23; phenolic resin having a density of 0.2–0.35 g/cc and diameters ranging from about 2–50 microns (available from Union Carbide under the trade designation of phenolic "microballoons"); polyvinylidene polymers and copolymers having a density of 0.03 and an average diameter of 25–28 microns (e.g., those commercially available from Dow Chemical Company under the trade designation "Saran" dry expanded resin-bubbles); etc. For a description of these and other organic resin microspheres, see U.S. Pat. No. 2,797,201.

(C) Volatile Organic Liquid Solvent

The compositions of the present invention contain at least about 10% or 20%, or 30% or 50% up to about 60% or 70% or 80% or 85 % by weight of at least one volatile organic liquid which is a solvent for the water-insoluble polymer or polymers (A) contained in the composition. Preferably, the solvent is not a solvent for the microspheres (B). That is, the hollow microspheres should not dissolve in the solvent. The volatile organic liquid or liquid mixture used as a solvent may be any liquid or liquids which will dissolve the water-insoluble polymers contained in the adhesive compositions, and when the compositions are to be used as adhesives such as solvent cements, the solvent which also is preferably a solvent for the plastic surface or surfaces which are to be welded or bonded together by the adhesive compositions. In addition, the organic liquids which are used as the solvents must be volatile, that is, it must be capable of vaporizing under a wide variety of application temperature conditions. In one embodiment, a volatile solvent is one which is capable of vaporizing at ambient or at temperatures slightly above ambient temperatures. The solvents should also be selected after consideration of the toxicity effects and biodegradability of the solvents.

Among the solvents which may be included in the compositions of the invention and which have been commonly used alone or in combination for adhesive compositions are lower alcohols such as methanol, ethanol and isopropanol; ketones such as acetone, methyl ethyl ketone (MEK), methyl isobutyl ketone, isophorone and cyclohexanone (CYH); esters such as methyl acetate, ethyl acetate, ethyl formate, ethyl propionate, and butyl acetate; halogenated solvents such as methylene chloride, ethylene dichloride, trichloroethylene; ethers such as methyl Cellosolve and dioxane; and other liquids such as tetrahydrofuran (THF), N-methy pyrolidone and dimethylformamide (DMF). As noted earlier the choice of solvent depends upon the type of water-insoluble polymer (A) and the intended use of the composition. For example, if the composition is to be used as a solvent cement for cementing two plastic surfaces together, the solvent or at least one solvent in a mixture should be capable of dissolving or softening the surface of the plastic. Although any of the above solvents may be used, it has been discovered that the preferred solvents when the compositions of the invention are to be used as solvent cements characterized as having low VOC, the solvents preferably are tetrahydrofuran, methyl ethyl ketone, acetone, cyclohexanone, dimethylformamide (DMF), and mixtures thereof, although DMF is no longer a desirable solvent in view of its carcinogenic potential in humans. Particularly useful solvents in the compositions of the present invention when polymer (A) is an ABS polymer are methyl ethyl ketone and acetone. In one embodiment, acetone is preferred since it can be used to prepare adhesive compositions of the present invention characterized by desirable viscosity and low toxicity. Mixtures of tetrahydrofuran (THF) and cyclohexanone and a mixture of THF, CYH, MEK and acetone are useful solvents in adhesive compositions when the water-insoluble polymer (A) is PVC. When the water-insoluble polymer (A) is CPVC, THF or mixtures of THF, CYH, MEK and acetone are useful solvents.

(D) Solid Particulate Inorganic Filler

In addition to the above components, the compositions may and preferably do contain at least one solid particulate inorganic filler. The amount of filler is determined by the end use of the composition. For example, adhesive compositions may contain a small amount whereas sealants will generally contain larger amounts of the filler. Thus, the adhesive compositions of the present invention may be characterized as containing from 0 to about 4% or even up to 5% by weight of at least one solid particulate inorganic filler. The adhesive compositions of the present invention generally will contain at least about 0.1% or 0.75% by weight up to about 1.5% or 3% or 4% by weight of the solid particulate inorganic filler. The particulate inorganic fillers are inert and are generally included in the compositions of the present invention to improve working viscosity and structural strength, to reduce costs, and/or to reduce the tendency of the hollow microspheres to separate and float to the surface of the composition (i.e., the filler helps to maintain the beads in suspension). The tendency of the glass bubbles to separate from a homogeneous mixture is referred to in the industry as "bead float-out".

The solid particulate inorganic fillers incorporated into the adhesive compositions of the present invention preferably are fine powders having an average particle size of less than about 50 microns and a density of less than about 4 g/cc. The inorganic fillers which can be utilized in the adhesive compositions of the present invention include amorphous silica, silica flour, ground quartz, talc, magnesium silicate, calcium carbonate, clay, whiting, shell flour, wood flour, alumina, antimony trioxide, asbestos powder, barium sulfate, calcined clays, China clays, magnesium oxide, mica powder, fumed silica, etc. A preferred filler is fumed silica available commercially from Cabot Corporation under the trade designation CAB-O-SIL and from the Degussa Corporation under the trade designation Aerosil. For example, CAB-O-SIL grade PTG is a fumed silica available from the Cabot Corporation and having a surface area of 200±25 m$^2$/g and a nominal particle diameter of 0.014 microns.

The compositions of the present invention should be thoroughly blended to provide substantially homogeneous mixtures. Substantially homogeneous mixtures are desirable since non-uniform mixtures will result in non-uniform distribution of the adhesive composition and non-uniform adhesion to substrate surfaces. If desired, small amounts of pigments or colorants such as titanium dioxide, carbon black or a dye or other colorant may be added to the adhesive compositions to serve as a guide for uniform mixing and to provide a method of identifying various adhesive compositions. In one embodiment, it is desirable to disperse the solid particulate inorganic filler into the polymer prior to addition of the hollow microspheres. For example, good results are obtained when the filler is dispersed into the polymer using a high speed Cowles type impeller.

The adhesive compositions formulated in accordance with the present invention generally have a minimum viscosity of about 500 centipoises (cps), and the viscosity may be as high as 10,000 to 15,000 cps provided that the adhesive compositions can be readily applied to the surfaces to be bonded. The molecular weights of the polymers (A) affect the viscosity of the adhesive composition. The use of polymers having lower inherent viscosities permits a higher polymer percentage or loading and thereby lower the amount of solvent required to achieve a given viscosity. Viscosities may range from about 8000 to about 15,000 cps and are readily obtained with the compositions of the present invention, and such viscosities are desirable since the adhesive may be applied to substrates without dripping and with little or no spillage. The adhesive compositions of the invention appear to form a "pseudo skin" which prevents the adhesive compositions from dripping once applied to a substrate.

The compositions of the present invention are easy to apply, cost effective, and cured within a reasonable period of time without the use of heat, pressure, UV light or extraordinary mechanical devices. The bonding or adhesive properties are satisfactory for the intended uses whether non pressure drain, waste, vent (DWV), applications or pressure systems used in potable water applications. One particular advantage of the adhesive compositions of the present invention is that the compositions are a one-component system and are "plumber friendly".

The compositions of the present invention are characterized as lower VOC compositions than similar compositions not containing the hollow microspheres. For example, the adhesive compositions of the present invention may also be characterized as lower VOC compositions than the presently available solvent cements. The use of the compositions of the present invention results in a reduction in organic emissions due to the use of a combination of lower VOC compositions, application methods (less waste), and the non-use of either cleaners or primers to achieve satisfactory results in bonding surfaces such as ABS and PVC pipe and fittings.

In accordance with the present invention, compositions can be prepared having desirable VOC limits by varying the amounts of the components, and in particular, through the use of the hollow microspheres such as the glass bubbles described above. The use of the inorganic hollow microspheres is desirable because they are chemically stable, water-insoluble, non-hazardous (non-toxic), of high strength, and they are compatible with the other ingredients used in the adhesive compositions. In accordance with the present invention, useful compositions can be prepared which may be characterized as low VOC compositions, and more particularly, adhesives characterized by VOC's of less than 500 and even less than 300 grams per liter.

The following examples illustrate the compositions of the present invention. Unless otherwise indicated in the following examples and elsewhere in the specification and claims, all parts and percentages are by weight.

EXAMPLE 1

| | |
|---|---|
| ABS resin (ADG-21) | 40% |
| Methyl ethyl ketone | 56% |
| E-22 glass bubbles | 4% |

EXAMPLE 2

| | |
|---|---|
| ABS resin (Blendex 211) | 40% |
| Methyl ethyl ketone | 56% |
| E-22 glass bubbles | 4% |

EXAMPLE 3

| | |
|---|---|
| ABS resin (Blendex 211) | 40% |
| Methyl ethyl ketone | 56% |
| K-2 glass bubbles | 4% |

EXAMPLE 4

| ABS resin (Blendex 211) | 40% |
|---|---|
| Methyl ethyl ketone | 56% |
| C-15 glass bubbles | 4% |

EXAMPLE 5

| ABS resin (Blendex 211) | 38% |
|---|---|
| Methyl ethyl ketone | 56% |
| E-22 glass bubbles | 6% |

EXAMPLE 6

| ABS resin (Blendex 211) | 36% |
|---|---|
| Methyl ethyl ketone | 56% |
| E-22 glass bubbles | 8% |

EXAMPLE 7

| ABS resin (Blendex 211) | 40% |
|---|---|
| Methyl ethyl ketone | 50% |
| E-22 glass bubbles | 10% |

EXAMPLE 8

| ABS resin (Blendex 211) | 34% |
|---|---|
| Methyl ethyl ketone | 56% |
| E-22 glass bubbles | 10% |

Some of the characteristics of the compositions of Examples 2–8 are summarized in the following Table I.

TABLE I

| Example | Viscosity (cps)[1] | Wt. (lbs)/gal | VOC (g/l) |
|---|---|---|---|
| 2 | 7060 | 6.53 | 438 |
| 3 | 10,000+ | 6.11 | 410 |
| 4 | 10,000+ | 6.02 | 404 |
| 5 | 7060 | 6.21 | 416 |
| 6 | 7500 | 5.83 | 391 |
| 7 | 10,000 | 5.51 | 370 |
| 8 | 7100 | 5.56 | 373 |

[1] ASTM D-2235

EXAMPLE 9

| ABS resin (Blendex 200) | 37% |
|---|---|
| Methyl ethyl ketone | 56.25% |
| E-22 glass bubbles | 6% |
| Talc | 0.75% |

EXAMPLE 10

| ABS resin (Blendex 211) | 37% |
|---|---|
| Methyl ethyl ketone | 56% |
| E-22 glass bubbles | 6% |
| PTG | 1% |

EXAMPLE 11

| ABS resin (Blendex 211) | 35% |
|---|---|
| Methyl ethyl ketone | 56% |
| E-22 glass bubbles | 8% |
| PTG | 1% |

EXAMPLE 12

| ABS resin (Blendex 211) | 34% |
|---|---|
| Methyl ethyl ketone | 56% |
| E-22 glass bubbles | 9% |
| PTG | 1% |

EXAMPLE 13

| ABS resin (Blendex 211) | 35% |
|---|---|
| Acetone | 56% |
| E-22 glass bubbles | 8% |
| PTG | 1% |

EXAMPLE 14

| ABS resin (Blendex 211) | 39% |
|---|---|
| Acetone | 56% |
| E-22 glass bubbles | 4% |
| PTG | 1% |

EXAMPLE 15

| ABS resin (Blendex 211) | 37% |
|---|---|
| Acetone | 56% |
| E-22 glass bubbles | 6% |
| PTG | 1% |

EXAMPLE 16

| ABS resin (Blendex 211) | 37% |
|---|---|
| Acetone | 53.85% |
| E-22 glass bubbles | 8% |
| PTG | 1.15% |

EXAMPLE 17

| ABS resin (Blendex 211) | 33% |
|---|---|
| Acetone | 55.75% |
| E-22 glass bubbles | 10% |
| PTG | 1.25% |

EXAMPLE 18

| ABS resin (Blendex 211) | 30.25% |
|---|---|
| Acetone | 51% |
| E-22 glass bubbles | 17.25% |
| PTG | 1.5% |

EXAMPLE 19

| | |
|---|---|
| ABS resin (Blendex 211) | 37% |
| Methyl ethyl ketone | 53.8% |
| E-22 glass bubbles | 8% |
| PTG | 1.15% |

EXAMPLE 20

| | |
|---|---|
| PVC resin (Geon 110X334) | 16.44% |
| THF | 45.67% |
| CYH | 11.01% |
| MEK | 0.15% |
| Acetone | 11.51% |
| E-22 glass bubbles | 13.20% |
| PTG | 2.02% |

EXAMPLE 21

| | |
|---|---|
| PVC resin (Geon 110X334) | 18.0% |
| THF | 53.0% |
| CYH | 12.0% |
| E-22 glass bubbles | 15.0% |
| PTG | 2.0% |

EXAMPLE 22

| | |
|---|---|
| CPVC resin (Geon 674X571) | 16.56% |
| THF | 51.04% |
| CYH | 6.00% |
| MEK | 9.86% |
| Acetone | 0.16% |
| E-22 glass bubbles | 12.05% |
| PTG | 2.63% |
| Orange dye | 0.70% |
| Tin stabilizer | 1.00% |

EXAMPLE 23

| | |
|---|---|
| CPVC resin (Geon 674X571) | 13.68% |
| THF | 68.50% |
| E-22 glass bubbles | 14.14% |
| PTG | 1.65% |
| Orange dye | 0.74% |
| Tin stabilizer | 1.29% |

EXAMPLE 24

| | |
|---|---|
| CPVC resin | 12.35% |
| THF | 51.68% |
| CYH | 9.53% |
| MEK | 0.51% |
| Acetone | 17.93% |
| E-22 glass bubbles | 4.03% |
| PTG | 2.50% |
| Orange dye | 0.46% |
| Tin stabilizer | 1.01% |

Some of the properties and characteristics of the compositions of Examples 10–18 and 20–23 are summarized in the following Table II.

TABLE II

| Example | Viscosity (cps)[1] | Wt. (lbs)/gal | VOC (g/l) |
|---|---|---|---|
| 10 | 10,000+ | 6.24 | 419 |
| 11 | 10,000+ | 5.91 | 397 |
| 12 | 10,000+ | 5.66 | 380 |
| 13 | 7500 | 5.90 | 396 |
| 14 | 8600 | 6.80 | 456 |
| 15 | 9300 | 6.28 | 405 |
| 16 | 9500 | 5.90 | 380 |
| 17 | 11,600 | 4.90 | 327 |
| 18 | 14,000 | 4.65 | 284 |
| 20 | 10,000+ | 5.30 | 434 |
| 21 | 10,000+ | 5.25 | 400 |
| 22 | 10,000+ | 5.60 | 450 |
| 23 | 10,000+ | 5.28 | 433 |

[1]ASTM D-2235

The utility of the compositions of the present invention, and in particular, the utility of the adhesive compositions as solvent cements for ABS pipes and fittings is demonstrated by testing the adhesive composition for lap shear strength after 48 hours in accordance with ASTM D-2235. ASTM D-2235 requires lap shear values of 800 psi after 48 hours but no values are given for hydrostatic burst since this specification is for DWV applications only. Hydrostatic quick burst strength tests are conducted per ASTM D-2564 (normally for PVC) using ABS pipe and couplings. There is no hydrostatic burst requirement on solvent cemented ABS pipe and couplings. The results of these tests conducted with the adhesive compositions of Examples 13–19 are summarized in the following Table III. For comparison, a standard ABS cement formulated to meet ASTM D-2235 and comprising 33% by weight of ABS resin and 67% of methyl ethyl ketone (Control-1) is also tested and these results are reported in Table III.

TABLE III

| | Test Results | |
|---|---|---|
| Adhesive Example | Lap Shear[1] (psi/48 hrs) | Hydrostatic Burst (psi) |
| 13 | 710 | Pipe burst at 320 |
| 14 | 830 | Pipe burst at 300 |
| 15 | 780 | Pipe burst at 310 |
| 16 | 701 | Pipe burst at 320 |
| 17 | 590 | Pipe burst at 290 |
| 18 | 255 | End cap broke at 290 |
| Control-1 | 800 | Pipe burst at 270[2] |

[1]Average of 5 replications per example.
[2]Considerable swelling of pipe prior to bursting.

The utility of the adhesive compositions containing ABS resin as solvent cements for PVC pipes and fittings is demonstrated by testing the adhesive composition of Examples 14, 16 and 19 on PVC to PVC parts per ASTM D-2564. The lap shear strengths after 24 and 48 hours were determined and the results (average of 5 replications per example) are summarized in Table IV.

TABLE IV

| | Test Results | |
|---|---|---|
| | Lap Shear (psi) | |
| Adhesive Example | 24 hrs. | 48 hrs. |
| 14 | 500 | 520 |
| 16 | 425 | 430 |
| 19 | 600 | 640 |

As can be seen, maximum lap shear values occur at the 24-hour interval. When methyl ethyl ketone is used as the sole solvent, higher lap shear values are observed.

Hydrostatic burst tests are performed on both two-inch Schedule 40 and Schedule 80 PVC assemblies per ASTM D-2564. The 24-hour results are reported in Table V.

TABLE V

| Adhesive Example | Schedule | Burst (psi) |
|---|---|---|
| 16 | 40 | 540 |
| 19 | 40 | 660 |
| 16 | 80 | 680 |
| 19 | 80 | 890 |

During application of solvent cement using the standard dauber included with the can of cement, some solvent is lost during application through drippings, evaporation, excess cement on outer pipe, and residual cement left in the can. All of these factors contribute to VOCs emitted into the atmosphere. The benefits of the adhesive composition of this invention in reducing VOC emissions are demonstrated in a series of experiments using two control cements (Control-1 and Control-2) and an adhesive of the invention as represented by Example 16. These formulations are as follows. Control-1 is a current standard ABS cement.

| Control-1 | |
|---|---|
| ABS resin | 33% |
| Methyl ethyl ketone | 67% |
| Control-2 | |
| ABS resin | 45% |
| Acetone | 55% |
| Example 16 | |
| ABS resin | 37% |
| Acetone | 53.85% |
| E-22 glass bubbles | 8% |
| PTG | 1.15% |

ABS two-inch pipe and end cap(s) meeting ASTM D-2661 are used. The purpose for two end caps on one five-inch piece of pipe is to show VOCs trapped within the piping system closely simulating in-field installations.

Four replications per each formula per one or two end capped pipe are used. The temperature during the test is 72° F.±1° F. Evaporation of VOCs and cement loss are recorded. The can is weighed before and after each application. Immediate cement loss from spillage, dripping and evaporation are measured, and then the VOCs evaporating from the joint after 15, 30 and 60-minute intervals and at 1, 2, 4, 8, 24, 48, 72, 96 and 168 hours (7 days) are recorded. Using a one-pint can of formula, the formulations are applied with the dauber in the can using standard application techniques as used by plumbers in the field per ASTM D-2855. The data and results are summarized in Table VI.

TABLE VI

| | Control-1 | Control-2 | Example 16 |
|---|---|---|---|
| One Cap | | | |
| Total cement applied/joint (gms) | 13.75 | 8.162 | 3.825 |
| Total cement on assembly/joint (gms) | 6.14 | 6.17 | 3.545 |
| Total waste (gms) | 7.61 | 2.00 | 0.280 |
| (% loss) | (55.34) | (24.40) | (7.32) |
| Two Cap | | | |
| Total cement applied/joint (gms) | 13.31 | 7.265 | 3.573 |
| Total cement on assembly/joint (gms) | 5.245 | 5.82 | 3.242 |
| Total waste (gms) | 8.065 | 1.445 | 0.330 |
| (% loss) | (60.6) | (20) | (9.23) |

The data summarized in Table VI demonstrate the reduction in waste when using the adhesive of this invention (Example 16). This reduction in waste represents a significant reduction in costs and VOC emissions.

The results of the tests conducted to determine the amount of VOC evaporating from the ABS joints bonded with the three cements are summarized in Table VII.

TABLE VII

| Two Cap | Control-1 | Control-2 | Example 16 |
|---|---|---|---|
| Cement on assembly (g) | 5.245 | 5.820 | 3.242 |
| Cement after* | | | |
| 15 min. | 4.505 | 5.42 | 3.106 |
| 30 min. | 4.363 | 5.28 | 3.053 |
| 45 min. | 4.342 | 5.205 | 3.024 |
| 60 min. | 4.28 | 5.13 | 2.998 |
| 2 hrs. | 4.237 | 5.055 | 2.95 |
| 4 hrs. | 4.196 | 4.94 | 2.904 |
| 8 hrs. | 4.122 | 4.83 | 2.859 |
| 24 hrs. | 4.127 | 4.765 | 2.843 |
| 48 hrs. | 4.09 | 4.726 | 2.82 |
| 72 hrs. | 4.038 | 4.696 | 2.81 |
| Total Loss | | | |
| grams | 1.206 | 1.123 | 0.431 |
| % | 23 | 19 | 13.3 |

*Average of 8 replications (8 caps-4 pipes)

The reduction in VOCs emitted from the cemented assemblies further demonstrates the advantage of the adhesive of the invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A composition comprising a mixture of
   (A) from about 5% to about 60% by weight of at least one water-insoluble polymer selected from acrylonitrile-butadiene-styrene polymer, polyvinyl chloride, chlorinated polyvinyl chloride or mixtures thereof;
   (B) from about 1% to about 30% by weight of glass or synthetic resinous hollow microspheres;
   (C) from about 10% to about 85% by weight of at least one volatile organic liquid which is a solvent for the polymer of (A); and
   (D) from about 0.1% to about 5% by weight of at least one solid particulate inorganic filler.

2. The composition of claim 1 wherein the hollow microspheres (B) are hollow glass microspheres.

3. The composition of claim 1 wherein the solvent (C) comprises methyl ethyl ketone, acetone, tetrahydrofuran, cyclohexanone or mixtures of two or more thereof.

4. The composition of claim 1 wherein the polymer is an acrylonitrile-butadiene styrene polymer and the solvent (C) comprises acetone, methyl ethyl ketone, or a mixture thereof.

5. The composition of claim 1 wherein the polymer is a polyvinyl chloride or chlorinated polyvinyl chloride polymer and the solvent (C) comprises tetrahydrofuran.

6. The composition of claim 1 wherein the filler is fumed silica.

7. An adhesive composition comprising a mixture of
(A) from about 5% to about 60% by weight of at least one acrylonitrile-butadiene-styrene polymer;
(B) from about 1% to about 30% by weight of glass or synthetic resinous hollow microspheres; and
(C) from about 10% to about 85% by weight of at least one volatile organic liquid which is a solvent for the polymer of (A).

8. The adhesive composition of claim 7 wherein the hollow microspheres (B) are hollow glass microspheres.

9. The adhesive composition of claim 7 wherein the hollow microspheres (B) comprise soda-lime-borosilicate glass.

10. The adhesive composition of claim 7 containing from about 3% to about 10% by weight of the hollow microspheres (B).

11. The adhesive composition of claim 7 wherein the hollow microspheres (B) have an average particle density of from about 0.1 to about 0.6 g/cc and a mean diameter of less than about 150 microns.

12. The adhesive composition of claim 7 wherein the volatile organic liquid (C) is methyl ethyl ketone, acetone, tetrahydrofuran, cyclohexanone or mixtures thereof.

13. The adhesive composition of claim 7 also containing 0.1% up to about 4% by weight of at least one solid particulate inorganic filler.

14. The adhesive composition of claim 13 wherein the filler is fumed silica.

15. An adhesive composition comprising a mixture of
(A) from about 10% to about 60% by weight of at least one acrylonitrile-butadiene-styrene polymer;
(B) from about 1% to about 20% by weight of inorganic or synthetic resinous hollow microspheres; and
(C) from about 20% to about 85% of at least one volatile organic liquid which is a solvent for the polymer of (A).

16. The adhesive composition of claim 15 wherein the hollow microspheres (B) have an average particle density of from about 0.1 to about 0.6 g/cc and a mean diameter of less than about 150 microns.

17. The adhesive composition of claim 15 wherein the solvent (C) is methyl ethyl ketone, acetone, tetrahydrofuran, cyclohexanone, or mixtures thereof.

18. The adhesive composition of claim 15 also containing
(D) at least one solid particulate inorganic filler.

19. The adhesive composition of claim 18 wherein the filler is fumed silica.

20. An adhesive composition for forming a bond or weld between two acrylonitrile-butadiene-styrene polymer or polyvinyl chloride surfaces comprising a mixture of
(A) from about 30% to about 50% by weight of an acrylonitrile-butadiene-styrene resin;
(B) from about 3% to about 10% by weight of hollow glass microspheres having an average particle density of from about 0.1 to about 0.4 g/cc;
(C) from about 50% to about 60% by weight of acetone or methyl ethyl ketone or mixtures thereof; and
(D) from about 0.75% to about 1.5% by weight of at least one solid particulate inorganic filler having an average particle size of less than about 50 microns.

21. The adhesive composition of claim 20 wherein the composition has a VOC is less than about 500 gms/liter.

22. The adhesive composition of claim 20 wherein (C) is acetone.

23. A method of adhesively bonding or welding a first plastic surface to a second plastic surface which comprises the steps of
(I) applying a composition comprising a mixture of
(A) from about 5% to about 60% by weight of at least one water-insoluble polymer;
(B) from about 1% to about 30% by weight of glass or synthetic resinous hollow microspheres; and
(C) from about 10% to about 85% by weight of at least one volatile organic liquid which is a solvent for the polymer of (A) to the first surface or the second surface, or both surfaces;
(II) contacting the first surface with the second surface; and
(III) allowing the adhesive composition to form a bond or weld between the first surface and the second surface.

24. The method of claim 23 wherein the composition applied in step (I) also contains (D) from about 0.1 to about 5% by weight of at least one solid particulate inorganic filler.

25. The method of claim 23 wherein the polymer (A) in the composition applied in step (I) comprises acrylonitrile-butadiene-styrene, polyvinyl chloride, chlorinated polyvinyl chloride or mixtures thereof.

26. A method of adhesively bonding or welding a first plastic surface to a second plastic surface which comprises the steps of
(I) applying a composition comprising a mixture of
(A) from about 10% to about 60% by weight of at least one water-insoluble polymer selected from acrylonitrile-butadiene-styrene polymer, polyvinyl chloride, chlorinated polyvinyl chloride or mixtures thereof;
(B) from about 1% to about 20% by weight of glass or synthetic resinous hollow microspheres; and
(C) from about 20% to about 70% by weight of at least one volatile organic liquid which is a solvent for the polymer of (A) to the first surface or the second surface, or both surfaces;
(II) contacting the first surface with the second surface; and
(III) allowing the adhesive composition to form a bond or weld between the first surface and the second surface.

27. The method of claim 26 wherein the first surface is the inner surface of a plastic fitting, and the second surface is the outer surface of a plastic pipe wherein the plastic is a polyvinyl chlorinated, chlorinated polyvinyl chloride or acrylonitrile-butadiene-styrene polymer.

28. The method of claim 26 wherein the composition also contains
(D) at least one solid particulate inorganic filler.

29. The method of claim 28 wherein the filler is fumed silica.

30. The method of claim 26 wherein the polymer is an acrylonitrile-butadiene-styrene resin, and at least one of the plastic surfaces is a polyvinylchloride or acrylonitrile-butadiene-styrene plastic surface.

31. The method of claim 26 wherein the polymer (A) is acrylonitrile-butadiene-styrene, and the volatile organic liquid (C) is acetone or cyclohexanone.

* * * * *